United States Patent
Smay et al.

(10) Patent No.: US 6,347,262 B1
(45) Date of Patent: Feb. 12, 2002

(54) MINIMUM FUEL ATTITUDE AND NUTATION CONTROLLER FOR SPINNING SPACECRAFT

(75) Inventors: John W. Smay, Redondo Beach; John F. Yocum, Rancho Palos Verdes; Salma Saeed, Santa Monica, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/477,643

(22) Filed: Jan. 5, 2000

(51) Int. Cl.$^7$ .............................. B64G 1/24; B64G 1/38
(52) U.S. Cl. ........................ 701/13; 701/226; 244/164
(58) Field of Search .......................... 701/13, 222, 226; 244/164, 171, 165, 170, 169

(56) References Cited

U.S. PATENT DOCUMENTS

| | | | | | |
|---|---|---|---|---|---|
| 4,758,957 A | * | 7/1988 | Hubert et al. | ................. | 701/13 |
| 4,931,942 A | * | 6/1990 | Garg et al. | ................. | 701/226 |
| 5,441,222 A | * | 8/1995 | Rosen | ......................... | 244/165 |
| 5,597,143 A | * | 1/1997 | Suranuer et al. | ............. | 244/164 |
| 5,794,892 A | * | 8/1998 | Salvatore | .................... | 244/165 |
| 5,826,828 A | * | 10/1998 | Fowell et al. | ............... | 244/164 |
| 5,826,829 A | * | 10/1998 | Holmes | ....................... | 244/165 |

* cited by examiner

Primary Examiner—Michael J. Zanelli
(74) Attorney, Agent, or Firm—Gates & Cooper LLP (57) ABSTRACT

A method, apparatus, article of manufacture, and a memory structure for controlling an attitude and a nutation of a spacecraft spinning about a first axis. The method comprises the steps of measuring a spacecraft attitude rate $\omega_1(t)$ about a second axis substantially orthogonal to the first axis; generating a rate correction value $\alpha\omega_1(t)/\lambda_0$, wherein $\lambda_0$ is an inertial nutation frequency of the spinning spacecraft, and $\alpha$ is a proportionality factor; determining a spacecraft attitude angle $\phi_2(t)$ about a third axis substantially orthogonal to the first axis and the second axis; generating an error signal e(t) as $\phi_2(t)+\alpha\omega_1(t)/\lambda_0$; and applying a torque to rotate the spacecraft along the second axis. The article of manufacture comprises a program storage device storing instructions implementing the instructions described above. The apparatus comprises an attitude rate sensor for measuring the spacecraft attitude rate $\omega_1(t)$ about a second axis substantially orthogonal to the first axis; means for measuring a spacecraft attitude angle $\phi_2(t)$ about a third axis substantially orthogonal to the first axis; a processor, in communication with the attitude rate sensor, for generating an error signal e(t)=$\phi_2(t)+\alpha\omega_1(t)/\lambda_0$, wherein $\lambda_0$ is an inertial nutation frequency of the spinning spacecraft, and a is a proportionality factor; and a torquer for applying a torque to the spacecraft along the second axis in accordance with the generated error signal e(t).

39 Claims, 7 Drawing Sheets

MINIMUM FUEL ATTITUDE AND NUTATION CONTROLLER FOR SPINNING SPACECRAFT

BACKGROUND OF THE INVENTION

1. Field of the Invention

The present invention relates to systems and methods for controlling spacecraft, and in particular to a system and method for controlling the attitude and nutation of a spinning spacecraft using body stabilized spacecraft instruments.

2. Description of the Related Art

Satellites are in widespread use. These satellites include communications satellites used to deliver television and communications signals around the earth for public, private, and military uses, and surveillance satellites for collecting earth surface data.

In most cases, the location and orientation of each satellite must be controlled to perform its mission. Various satellite control system designs have evolved to achieve this purpose, including spin-stabilized and body stabilized designs. In spin-stabilized spacecraft designs, the spacecraft is stabilized by spinning satellite itself (or a momentum or reaction wheel within the satellite) about an axis. In body stabilized spacecraft designs, the spacecraft is stabilized in inertial space, typically with the use of an inertial guidance system which can include body mounted angular rate sensors to measure attitude rates and one or more staring inertial position sensors to measure instantaneous attitude (e.g. a sun sensor, star sensor, or earth sensor).

Many spacecraft provide dual-mode operation. Such satellites can be spin-stabilized to control attitude during high-thrust ascent maneuvers and in safe-hold modes, and body stabilized when performing their mission in operational orbit. To control the attitude of a spin-stabilized spacecraft having attitude control thrusters, the most efficient control of attitude and nutation is accomplished when synchronous (spin synchronous or nutation synchronous) pulsing is applied, as contrasted to continuous rate and/or position feedback control as is typically used on a body stabilized spacecraft.

Unfortunately, current dual-mode satellites use complex and expensive "spin unique" sensors and logic to stabilize the spacecraft when in the spin stabilized mode, and the inertial guidance system sensors and logic when in the body-stabilized mode. This increases the complexity, cost, and weight of the spacecraft.

What is needed is a simple method for autonomous attitude and nutation control of a spinning spacecraft that uses the simple continuous sensing and control law feedback compensation that is typically used on body-stabilized spacecraft. The present invention satisfies that need.

SUMMARY OF THE INVENTION

To address the requirements described above, the present invention discloses a method, apparatus, and article of manufacture for controlling the attitude and nutation of a spacecraft spinning about a first axis.

The method comprises the steps of measuring a spacecraft attitude rate $\omega_1(t)$ about a second axis substantially orthogonal to the first axis; generating a rate correction value $\alpha\omega_1(t)/\lambda_0$, wherein $\lambda_0$ is an inertial nutation frequency of the spinning spacecraft, and $\alpha$ is a proportionality factor; determining a spacecraft attitude angle $\phi_2(t)$ about a third axis substantially orthogonal to the first axis and the second axis; generating an error signal $e(t)$ as $\phi_2(t)+\alpha\omega_1(t)/\lambda_0$; and applying a torque to rotate the spacecraft along the second axis. The article of manufacture comprises a program storage device implementing the instructions described above.

The apparatus comprises an attitude rate sensor for measuring the spacecraft attitude rate $\omega_1(t)$ about a second axis substantially orthogonal to the first axis; means for measuring a spacecraft attitude angle $\phi_2(t)$ about a third axis substantially orthogonal to the first axis; a processor, in communication with the attitude rate sensor, for generating an error signal $e(t)=\phi_2(t)+\alpha\omega_1(t)/\lambda_0$, wherein $\lambda_0$ is an inertial nutation frequency of the spinning spacecraft, and $\alpha$ is a proportionality factor; and a torquer for applying a torque to the spacecraft along the second axis in accordance with the generated error signal $e(t)$.

The foregoing not only provides the more efficient spinning control method, but also uses the same feedback structure and sensing instruments employed for body-stabilized control. Hence, a single sensor set and control structure may be used for both spinning and body stabilized modes of operation.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1A:
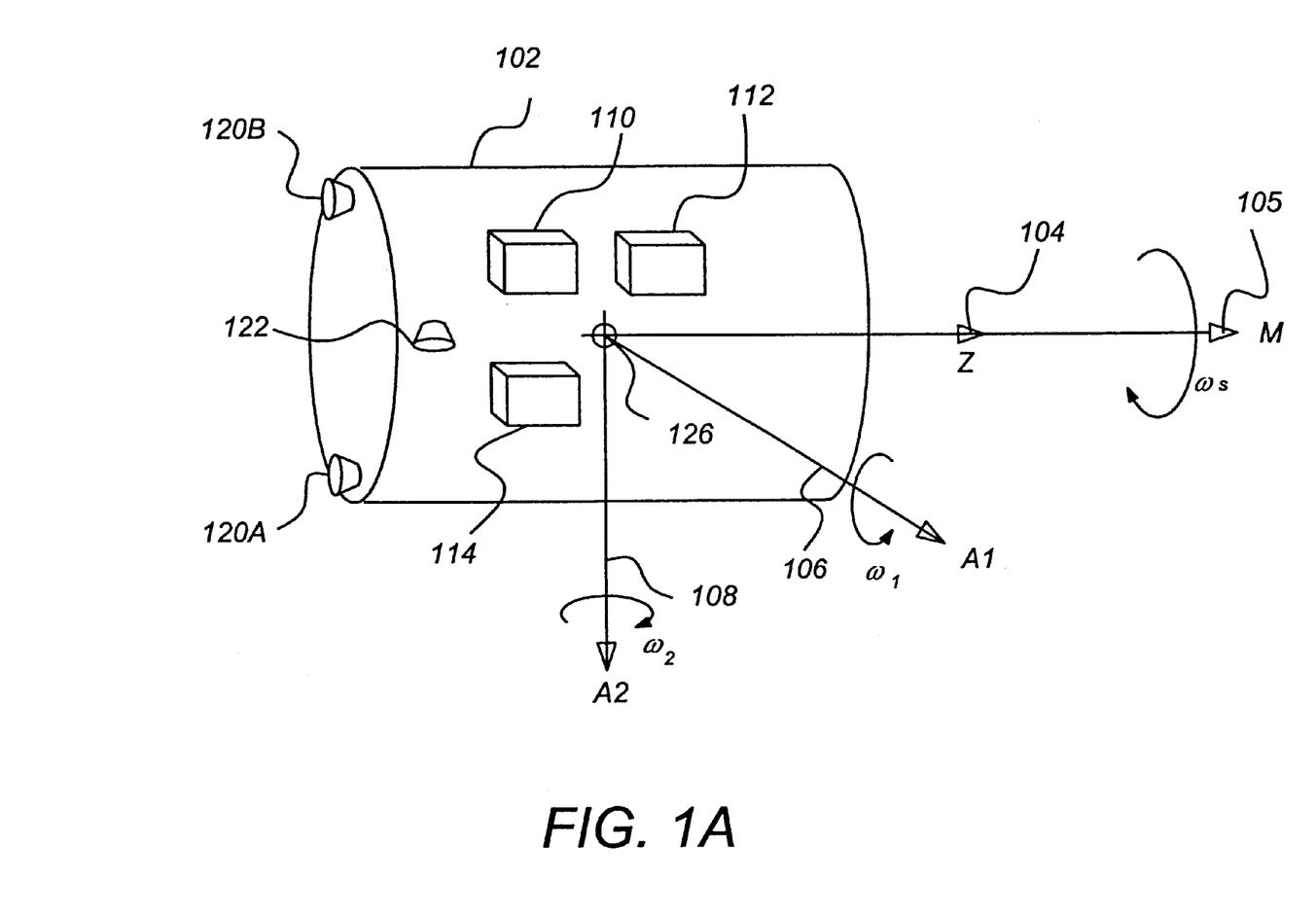
FIGS. 1A and 1B are schematic representations of a spinning spacecraft that may be controlled by the present invention.

FIG. 1A is a schematic representation of a spacecraft 102 (hereinafter alternatively referred to as a satellite) spinning about a first or longitudinal axis 104 at a rate $\omega_s$, thus defining a spin axis and momentum vector M 105. A second axis A1 106 is defined which is substantially orthogonal to the longitudinal axis 104. Further, a third axis A2 is defined, which is substantially orthogonal to both the longitudinal axis 104 and the second axis 106.

Figure 1B:
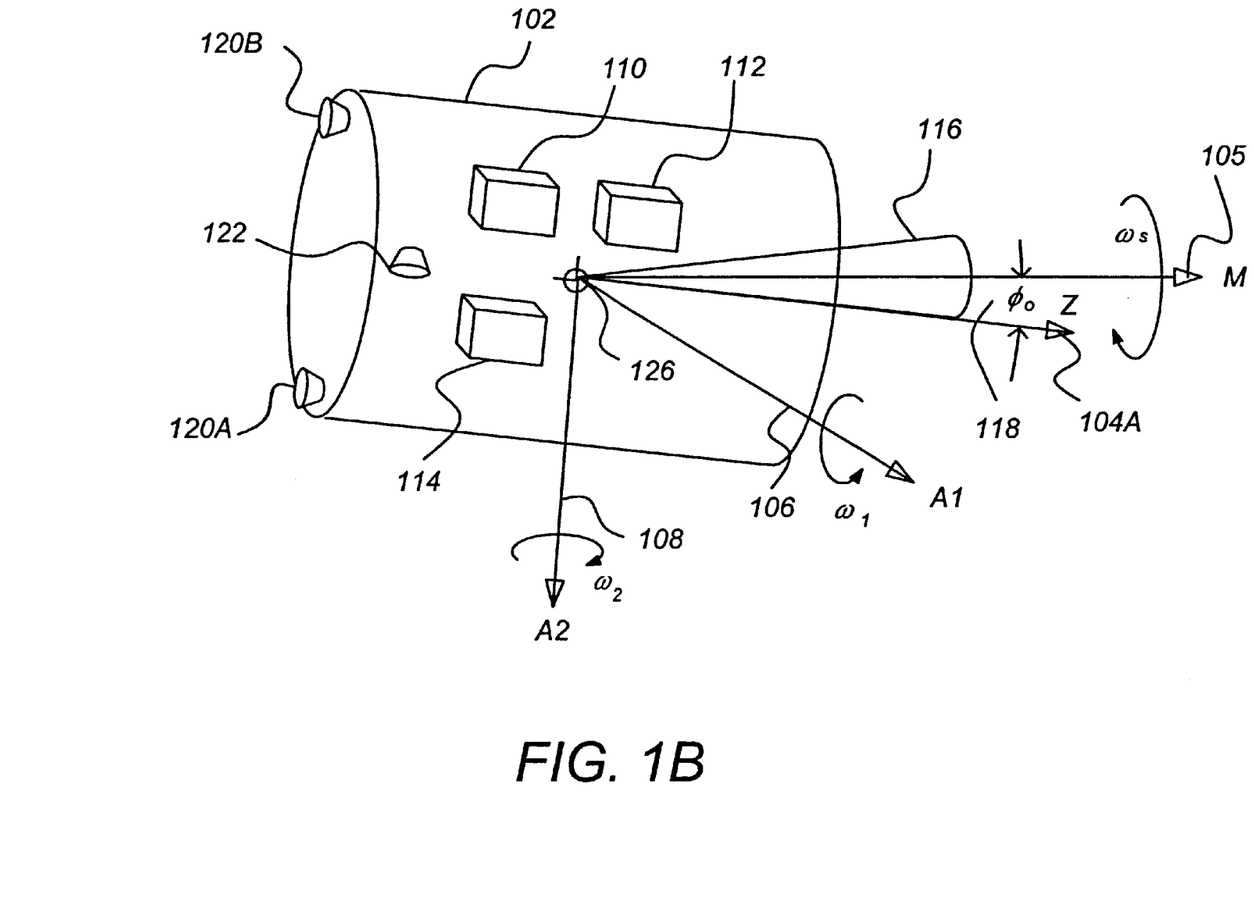

FIG. 1B is a schematic representation of the spacecraft 102 in which the spacecraft's longitudinal axis 104 is displaced to a displaced longitudinal axis position 104A which is not aligned with the momentum vector 104, resulting in an attitude error angle $\phi_0$ 118. Since the spacecraft 102 is rotating at spin rate $\omega_s$, displaced longitudinal axis 104A rotates about the spin axis, thus defining a conic section 116.

The spacecraft 102 comprises one or more axial jet or thrusters 120A and 120B (hereinafter referred to as axial thruster(s) 120) displaced from the spin axis 104, and one or more radial jets or thrusters 122. The axial thrusters 120 can be disposed on opposite sides of the spin axis 104. For spin axis correction, only one of the axial thrusters 120 is pulsed at a time.

The activation of one of the axial thrusters 120 allows control of the spacecraft 102 attitude error $\phi_0$ 118. However, the timing of such activation is critical to assure that the proper torque is applied to the spacecraft 102. For example, in the illustration presented in FIG. 1B, the attitude error $\phi_0$ 118 and the axial thruster 120A are co-aligned, and a pulse of the axial thruster 120A causes the spacecraft 102 to rotate about second axis A1 to null out the attitude error $\phi_0$ 118.

Spin stabilized spacecraft typically utilize unique spin sensors and control logic to determine the timing, duration, and impulse delivered by the axial thrusters 120 to null out the attitude error angle $\phi_0$ 118 and nutation errors. One such system is disclosed in U.S. Pat. No. 4,837,699, which is hereby incorporated by reference herein. However, as described herein, these sensors are not well suited for use when the spacecraft 102 enters the body-stabilized mode. Hence, such unique spin sensors and control logic add to the cost and complexity of the spacecraft. Although it is possible to use simple continuous spin thruster control, such implementations typically result in unacceptably high propellant consumption, and are thus generally only useful where short duration, high bandwidth control is desired.

Using the present invention, the application of torque is controlled by a spacecraft control processor 114, which utilizes the same instruments used in the body stabilized mode (namely, attitude rate instruments and sensors 110 and attitude position sensors 112) to determine the proper timing, duration, and impulse to be delivered by the axial thrusters 120 to null out the attitude error angle $\phi_0$ 118. This allows a single sensor set and control structure to be used for both spinning and body-stabilized operational modes.

Figure 2:
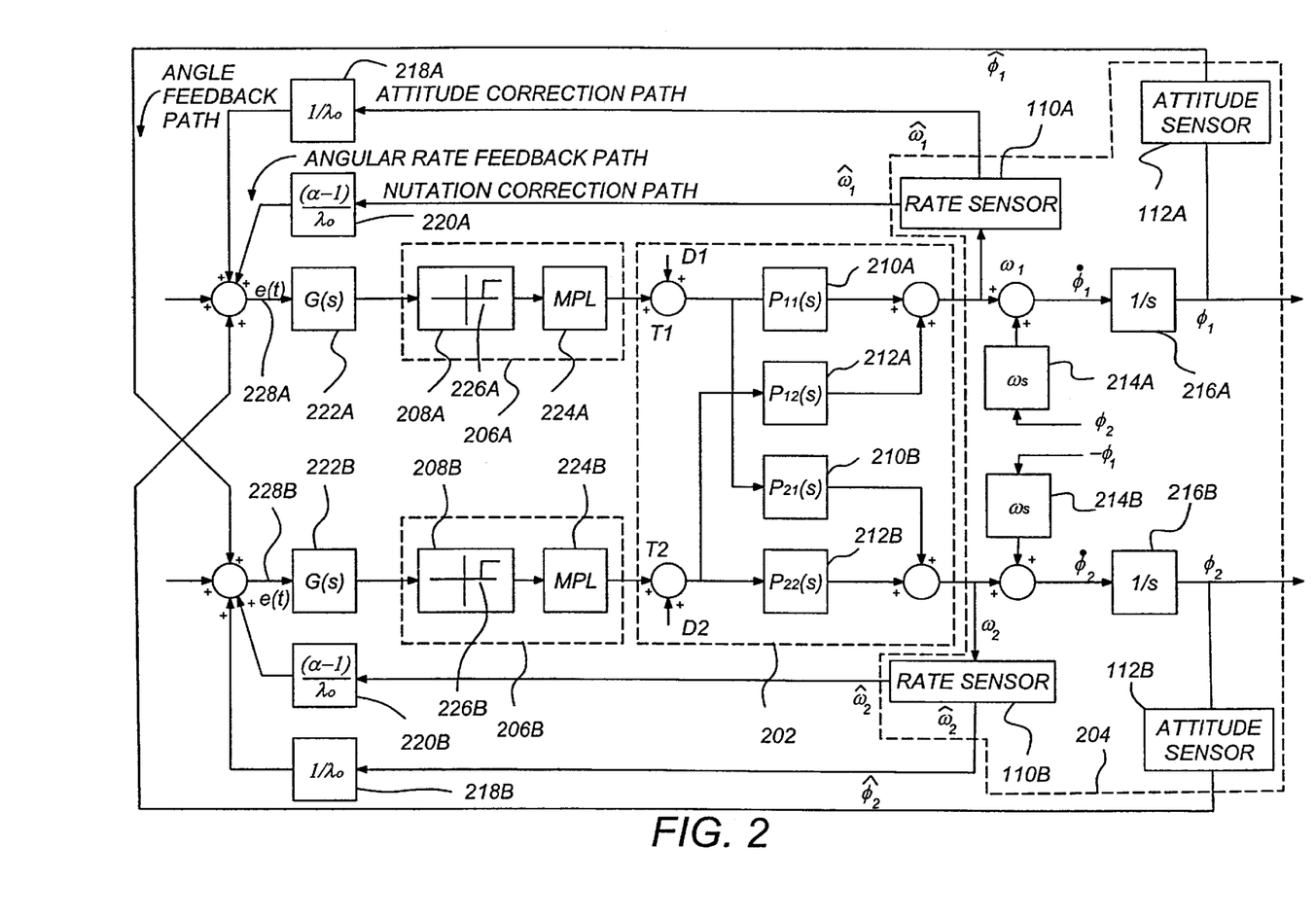
FIG. 2 is a functional block diagram of the spin axis controller (SAC) of the present invention.

FIG. 2 is a functional block diagram of one embodiment of the spin axis controller of the present invention. The spin axis controller includes a linearized representation of the spacecraft dynamics 202, sensor kinematics 204, and thruster control logic 206A, 206B (hereinafter collectively referred to as thruster control logic 206). As discussed above, in a spinning body, "attitude" refers to the inertial position of the angular momentum vector M 105 and rate control is typically termed nutation control because nutation is the dominant component of free motion of a spinning spacecraft about the angular momentum vector M 105.

The linearized dynamic torque equations for a spinning spacecraft are well known. The Laplace transform plant transfer function P(s) elements relating control torques to angular rates in the linearized dynamics can be expressed as:

$$P_{11}(s) = \frac{s^2}{\Delta_p(s)} \approx P_{22}(s) \approx -\frac{s}{\lambda_s} P_{12}(s) \approx \frac{s}{\lambda_s} P_{21}(s); \quad (1)$$

wherein $\Delta_p(s) = I_T s[s^2 + \lambda_p^2] \approx I_T s[S^2 + \lambda_s^2]$. The terms $P_{11}(s)$ and $P_{22}(s)$ are in-channel elements depicted in FIG. 2 as 210A and 212B respectively, and the terms $P_{12}(s)$ and $P_{21}(s)$ are the cross channel elements depicted in FIG. 2 as 212A and 210B, respectively. Defining a spin to transverse axis inertia ratio $$\sigma = \frac{I_s}{I_T},$$

one can define the inertial and body nutational frequencies respectively as:

$$\lambda_0 = \sigma \omega_s; \lambda_s = (\sigma - 1) \omega_s \quad (2)$$

For simplification purposes, the present invention is described using a model for a dynamically balanced spacecraft (in which products of inertia vanish) and having equal transverse moments of inertia. This simplifies the above model, and results in a decoupling of the transverse axis plant elements from the spin axis and a large degree of symmetry and simplicity of the transverse elements.

The spin axis controller includes an inertial rate measuring gyroscope or similar device 110A, 110B to measure spacecraft angular rates of rotation $\omega_1(t)$ and $\omega_2(t)$ around axes 106 and 108, thereby producing measured angular rates $\hat{\omega}_1(t)$ and $\hat{\omega}_2(t)$, respectively. The sensor kinematics 204 also includes factors 214A and 214B, to account for rate crosscoupling effects. The angular rates $\phi_1(t)$ and $\phi_2(t)$ are integrated by kinematic integration elements 216A and 216B, respectively, to produce attitude positions $\phi_1(t)$ and $\phi_2(t)$, which are measured by the attitude sensors 112A and 112B, respectively, to produce measured attitudes $\hat{\phi}_1(t)$ and $\hat{\phi}_2(t)$.

As illustrated in FIG. 2, both control torques (represented as T1 and T2) and additive disturbance torques (represented by D1 and D2) are modeled. The thruster control logic for each channel 206 includes a related deadband element 208A and 208B (hereinafter alternatively referred to as deadband element(s) 208), and a minimum pulse logic module 224A and 224B (hereinafter alternatively referred to as pulse logic module(s) 224). The deadband element 208 allows an input to be supplied to the minimum pulse logic module 224 when the signal entering the deadband element exceeds the deadband threshold 226. In each channel, the input to the deadband elements 208A and 208B includes an error signal e(t) 228A and 228B (hereinafter alternatively referred to as error signal(s) 228), which are processed by control compensation G(s) 222A and 222B (hereinafter alternatively referred to as control compensation 222).

The control compensation G(s) 222 is used to filter out unwanted signal components such as wobble, misalignment, noise, flexible body modes. In addition to, or in the alternative, separate compensation filters can be applied to the angular rate paths and angle feedback paths. Further, it is noted that although the foregoing implementation is described in terms of external torques applied to the spacecraft 102 via external thrusters, the present invention is equally applicable to other torqueing devices such as magnetic or electric thrusters.

FIG. 2 depicts two attitude and nutation control loops, however, as is further discussed below, the second thruster control logic elements 206B and correction paths 218B and 220B are primarily of use either for redundancy or for control enhancement. Also, although a simple deadband and minimum pulse control logic is represented, many similar torque generation logic schemes may be applicable to the invention. The control law for the angle feedback paths and the angular rate feedback paths of the spin axis controller are derived and described.

A one or two axis position sensor of a type typically used in a body-stabilized spacecraft is mounted on the spacecraft 102 body. Hence, the spin motion $\omega_s(t)$ of the spacecraft body gives rise to a kinematic relationship between the spacecraft 102 attitude rates $\dot{\Phi}_1$ and $\dot{\Phi}_2$ and attitude angles $\Phi_1$ and $\Phi_2$ as follows:

$$\dot{\Phi}_1 = \omega_1 + \omega_s \Phi_2, \text{ and } \dot{\Phi}_2 = \omega_2 - \omega_s \Phi_1 \quad (3)$$

Recognizing that where the driving body transverse rates are sinusoidal and in quadrature (as they are with nutation), the attitude angles measured by the body fixed sensors are likewise sinusoidal and expressed as:

$$\begin{bmatrix} \omega_1(t) \\ \omega_2(t) \end{bmatrix} = \omega_0 \begin{bmatrix} \cos\lambda_s(t) \\ \sin\lambda_s(t) \end{bmatrix} \Rightarrow \begin{cases} \phi_1 = \dfrac{\omega_2}{\lambda_0} \\ \phi_2 = \dfrac{-\omega_1}{\lambda_0} \end{cases} \quad (4)$$

where $\omega_0$ is magnitude of the nutation component of the angular error.

Developing an equivalent plant transfer function, from torque to attitude yields $$\begin{aligned}
\phi &= \frac{1}{s^2 + \omega_s^2} \begin{bmatrix} s & \omega_s \\ -\omega_s & s \end{bmatrix} \omega \quad (5) \\
&= \frac{1}{s^2 + \omega_s^2} \begin{bmatrix} s & \omega_s \\ -\omega_s & s \end{bmatrix} P(s)T \\
&= \tilde{P}(s)T \\
&= \frac{1}{s^2 + \omega_s^2} \begin{bmatrix} sP_{11} + \omega_s P_{21} & sP_{12} + \omega_s P_{22} \\ sP_{21} - \omega_s P_{11} & sP_{22} - \omega_s P_{12} \end{bmatrix} T \\
&= \frac{1}{(s^2 + \omega_s^2)\Delta_p} \begin{bmatrix} s(s^2 + \lambda_s \omega_s) & s^2(\omega_s - \lambda_s) \\ -s^2(\omega_s - \lambda_s) & s(s^2 + \lambda_s \omega_s) \end{bmatrix} T.
\end{aligned}$$

By forming a general closed-loop feedback equation and subsequently simplifying the feedback to a diagonal feedback symmetric linear combination of rate and attitude, an equivalent plant $\hat{P}$ emerges.

It is desirable to exploit the high degree of symmetry in the two transverse axis equations. To this goal, the same compensation is used in both to obtain a relatively simple expression for the system characteristic equation $|+L(s)|$, where $L(s)$ is the system open-loop transmission feedback matrix. This can be expressed as $$T = F\omega + G\Phi = FPT + G\tilde{P}T = [FP + G\tilde{P}]T = LT \quad (6)$$

$$\begin{aligned}
\begin{bmatrix} T_1 \\ T_2 \end{bmatrix} &= \begin{bmatrix} F_{11} & F_{12} \\ F_{21} & F_{22} \end{bmatrix} \begin{bmatrix} \omega_1 \\ \omega_2 \end{bmatrix} + \begin{bmatrix} G_{11} & G_{12} \\ G_{21} & G_{22} \end{bmatrix} \begin{bmatrix} \phi_1 \\ \phi_2 \end{bmatrix} \quad (7) \\
&= \frac{\alpha}{\lambda_o} \begin{bmatrix} G_{12} & 0 \\ 0 & G_{21} \end{bmatrix} \begin{bmatrix} \omega_1 \\ \omega_2 \end{bmatrix} + \beta \begin{bmatrix} 0 & G_{12} \\ -G_{21} & 0 \end{bmatrix} \begin{bmatrix} \phi_1 \\ \phi_2 \end{bmatrix},
\end{aligned}$$

where $\alpha$ and $\beta$ are gains on rate and position feedback and the expression is simplified by expressing cross-axis rate compensation as $I/\lambda_0$ times the position compensation. Combining terms, defining equivalent plant symbols $\hat{P}_{ij}(s)$ and forming the return difference matrix, $$\begin{aligned}
L &= \begin{bmatrix} G_{12}[(\alpha/\lambda_o)P_{11} + \beta\tilde{P}_{21}] & G_{12}[(\alpha/\lambda_o)P_{12} + \beta\tilde{P}_{22}] \\ G_{21}[(\alpha/\lambda_o)P_{21} - \beta\tilde{P}_{11}] & G_{21}[(\alpha/\lambda_o)P_{22} - \beta\tilde{P}_{12}] \end{bmatrix} \quad (8) \\
&= \begin{bmatrix} G_{12}\hat{P}_{11} & G_{12}\hat{P}_{12} \\ G_{21}\hat{P}_{21} & G_{21}\hat{P}_{12} \end{bmatrix} \\
&= \begin{bmatrix} G_{12} & 0 \\ 0 & G_{21} \end{bmatrix} \hat{P}.
\end{aligned}$$

The system characteristic equation dictating stability is $$|I + L(s)| = (1 + G_{12}\hat{P}_{11})(1 + G_{21}\hat{P}_{22}) - G_{12}\hat{P}_{12}G_{21}\hat{P}_{21} \quad (9)$$

$$= 1 + G_{12}\hat{P}_{11} + G_{21}\hat{P}_{22} + G_{12}\hat{P}_{11}G_{21}\hat{P}_{22} -$$

-continued $$G_{12}\hat{P}_{12}G_{21}\hat{P}_{21}$$

$$= (1 + G_{12}\hat{P}_{11})\left[1 + \frac{G_{21}\hat{P}_{22}(1 + G_{12}\hat{P}_{11}) - G_{12}\hat{P}_{12}G_{21}\hat{P}_{21}}{1 + G_{12}\hat{P}_{11}}\right]$$

$$= (1 + G_{12}\hat{P}_{11})\left[1 + \frac{G_{21}\{\hat{P}_{22} + G_{12}[\hat{P}_{11}\hat{P}_{22} - \hat{P}_{12}\hat{P}_{21}]\}}{1 + G_{12}\hat{P}_{11}}\right]$$

$$\approx (1 + G_{12}\hat{P}_{11})\left[1 + \frac{G_{21}\hat{P}_{22}}{1 + G_{12}\hat{P}_{11}}\right]$$

$$= (1 + G_{12}\hat{P}_{11})(1 + G_{21}\hat{P}^*)$$

Then note also $$P_{11}P_{22} - P_{12}P_{21} = [s^2(s^2 + \lambda_s^2)]/\Delta_p^2 + (s^2 + \lambda_s^2)/[I_T^2(s^2 + \lambda_p^2)] \approx (1/I_T s)P(10)$$

Substituting in the characteristic equation (9) for the case of rate feedback only $$\begin{aligned}
|I + L(s)| &\approx (1 + F_{22}P_{22})\left\{1 + F_{11}\left[\frac{P_{11}[1 + (1/sI_T)F_{22}]}{1 + F_{22}P_{22}}\right]\right\} \quad (11) \\
&\approx (1 + F_{22}P_{22})\left\{1 + F_{11}\left[\frac{P_{22}[1 + (1/sI_T)F_{22}]}{1 + F_{22}P_{22}}\right]\right\} \\
&\approx (1 + F_{22}P_{22})\left\{1 + F_{11}\left[\frac{P_{22}}{1 + F_{22}P_{22}}\right]\right\} \\
&\approx (1 + F_{22}P_{22})(1 + F_{11}P^*)
\end{aligned}$$

Where in this form $F_{11} = (\alpha/\lambda_0)G_{12}$ and $F_{22} = (\alpha/\lambda_0)G_{21}$. Referring to this formulation, suppose the 2-axis loop is closed first with stable compensation $F_{22}$. Then in designing the 1-axis compensator for stability purposes, the equivalent plant $P^*$ (which has open-loop poles at the closed-loop poles of the 2-axis loop, and open-loop zeros at the original plant zeros and in addition at the poles of the 2-axis compensator) is obtained. It is noted for reference that $P^*$ has exactly the form of the disturbance transmission for the single input-single output (SISO) 2-axis system. The last step may not always be appropriate; however, in the case of a nutation control it may be that $F(0) \to Ks$, leading to $F(0) \to K/I_T \ll 1$, over the frequency range of interest, hence the approximation indicated.

For the case of both rate and position feedback, and expression as simple as (11) is not available for the quantity $\hat{P}_{11}\hat{P}_{22} - \hat{P}_{12}\hat{P}_{21}$. However investigation of actual cases has shown that $$\hat{P}_{11} \approx \hat{P}_{22} \approx \hat{P}_{22} + G_{21}[\hat{P}_{11}\hat{P}_{22} - \hat{P}_{12}\hat{P}_{21}] \quad (12)$$

which facilitates the last approximation for $P^*$ in Equation (9).

Using $P(s)$ from (1), $\tilde{P}(s)$ from (5), and $\hat{P}$ from (8) these plant elements simplify to $$\begin{aligned}
\hat{P}_{11} &\approx \hat{P}_{22} \quad (13a) \\
&\approx \frac{(\alpha/\lambda_o)s[s^2 + \omega_s^2 + \beta(\lambda_s\lambda_o - \omega_s\lambda_o)/\alpha]}{I_T(s^2 + \lambda_s^2)(s^2 + \omega_s^2)} \\
&= \frac{(\alpha/\lambda_o)s[s^2 + \lambda_s^2 + \omega_s^2\beta(\sigma/\alpha)(1 - \alpha)(\alpha - 2)]}{I_T(s^2 + \lambda_s^2)(s^2 + \omega_s^2)}
\end{aligned}$$

-continued $$\hat{P}_{11} \to (s/\omega_s)\hat{P}_{11} \approx \frac{(s/\omega_s)[s^2 + \omega_s\lambda_s]}{I_T(s^2 + \lambda_s^2)(s^2 + \omega_s^2)};$$

$$\alpha/\sigma, \beta \to 1 : \hat{P}_{11} \to \frac{(s/\lambda_o)}{I_T(s^2 + \omega_s^2)}; \alpha, \beta \to 1$$

$$\hat{P}_{21} \approx -\hat{P}_{21} \quad (13b)$$

$$\approx \frac{[\beta(s^2 + \lambda_s\omega_s) - (\alpha\lambda_s/\lambda_o)(s^2 + \omega_s^2)]}{I_T(s^2 + \lambda_s^2)(s^2 + \omega_s^2)}$$

$$= \frac{[s^2(\beta - \alpha\lambda_s/\lambda_o) + \lambda_s\omega_s(\beta - \alpha\omega_s/\lambda_o)]}{I_T(s^2 + \lambda_s^2)(s^2 + \omega_s^2)}$$

$$\hat{P}_{12} \to (s/\omega_s)\hat{P}_{12} \approx \frac{(s/\omega_s)s(\omega_s - \lambda_s)}{I_T(s^2 + \lambda_s^2)(s^2 + \omega_s^2)};$$

$$\alpha/\sigma, \beta \to 1 : \hat{P}_{12} \to \frac{(\omega_s/\lambda_o)}{I_T(s^2 + \omega_s^2)}; \alpha, \beta \to 1$$

Figure 3A:
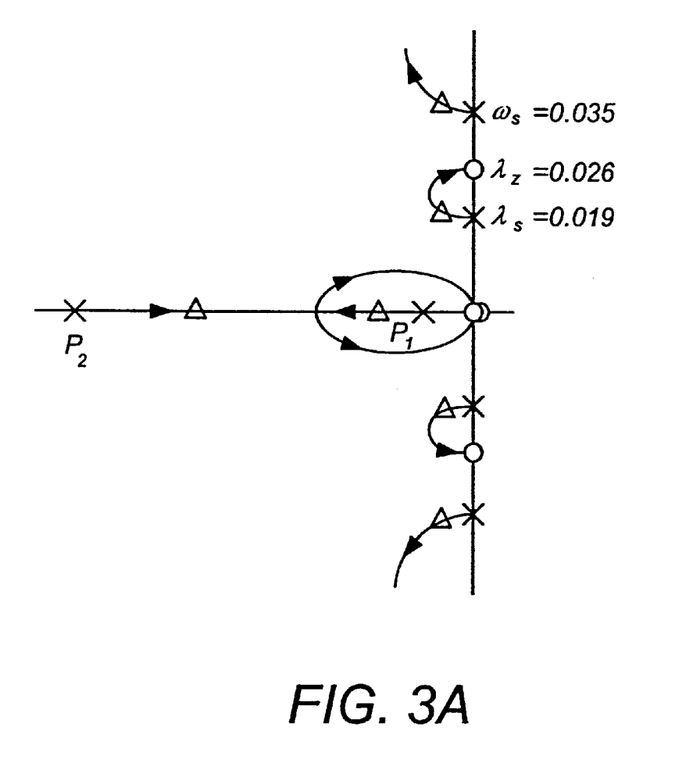
FIGS. 3A and 3B show root locus plots resulting from sequentially closing roll and pitch control loops.
Figure 3B:
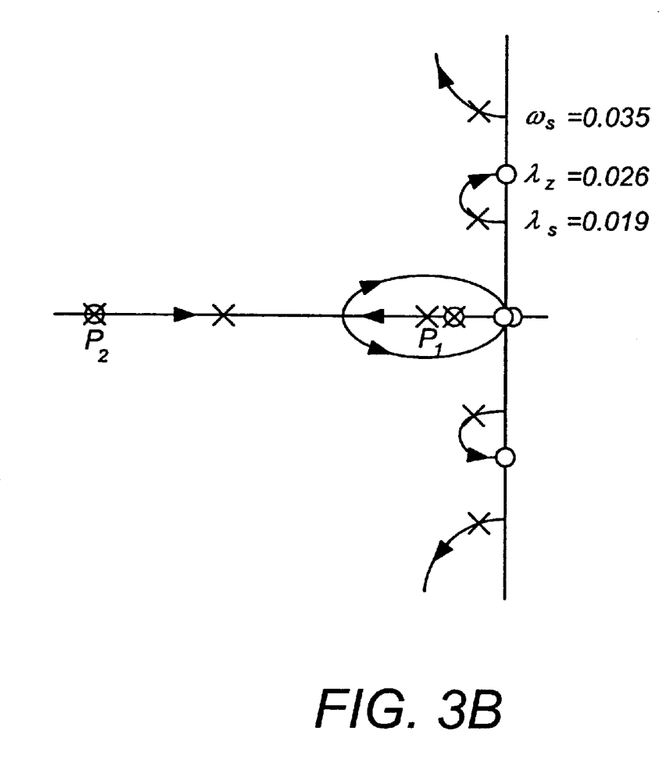

From these equations, it can be observed that the common poles are at nutation, $\lambda_s$, and spin kinematics $\omega_s$, In our design only the output of diagonal plant elements $\hat{P}_{ii}$ are used for feedback. These plant elements have zeros at the roots of $(\alpha/\lambda_0)s[s^2+\omega_s^2+\beta(\lambda_s\lambda_0-\omega_s\lambda_0)/\alpha]$. It is insightful to consider $\beta=1$. Then when ax is large the zeros approach the kinematic poles at co on the imaginary axis from below, as shown in FIGS. 3A and 3B below. When $\alpha=1$ the zeros cancel the imaginary nutation poles at $\lambda_s$, shown clearly by the expansion of the second form in Equation (13a). By physical reasoning, it can be seen that the scaled nutation rate and the measured angle cancel, hence decoupling nutation from the feedback, i.e., canceling the pole or making nutation unobservable. For small $\alpha$, the zeros recede through the origin and approach infinity. Examination of FIGS. 3A and 3B leads to the conclusion that ac must be greater than unity in order to achieve a design that stabilizes nutation.

Using the plant elements of interest in the present problem the meaning of the last form of the characteristic equation (9) is reconsidered. First, the term $(1+G_{12}\hat{P}_{11})$ is the SISO characteristic equation resulting when only one axis of feedback is used, for example, only roll or only pitch.

FIGS. 3A and 3B show root locus plots resulting from sequentially closing the roll and pitch loops. FIG. 3A is a representative root locus plot when only one axis of feedback is used. FIG. 3B shows the root structure of P* (closure of the second loop). Note that the incremental root locus due to closure of the second loop simply draws the roots farther along the path established by closure of the first loop. Although this may not be the case for very high gains, this result is useful. Note also that the function defined by Equation (9) $G_{21}P^*=G_{21}\hat{P}_{22}/[1+G_{12}\hat{P}_{11}]$ is expressed like the closed-loop transfer function of a SISO system, hence, its Nichols plot tends to have magnitude less than unity.

These results show that closure of the first loop produces closed-loop poles originating at the open-loop poles of $G_{12}\hat{P}_{11}$, and moving to the zeros of this function according to the standard SISO root locus rules. They further show that closure of the second loop produces closed-loop poles originating at the poles of $1/[1+G_{12}\hat{P}_{11}]$ (closed-loop poles resulting form the first loop closure) and traversing loci toward the zeros of $G_{12}\hat{P}_{11}$ which for symmetry are the same zeros governing the loci of the first loop. Stated another way, closure of the second loop is approximately equivalent to simply increasing the gain of the first loop.

It follows from this discussion and inspection of FIGS. 3A and 3B that closure of the second loop will increase the stability of a conditionally stable root, such as the nutation root displaced to the right half-plane with a dedamper, but will only further destabilize a root that is being driven to the right half-plane by high gain.

The purpose of the discussion in the following paragraphs is to illustrate in simple physical signal terms the isolation, or separate measurement of attitude $\Phi_0$ and nutation $\theta_0$ resulting from our unique sensing and feedback architecture.

Figure 4A:
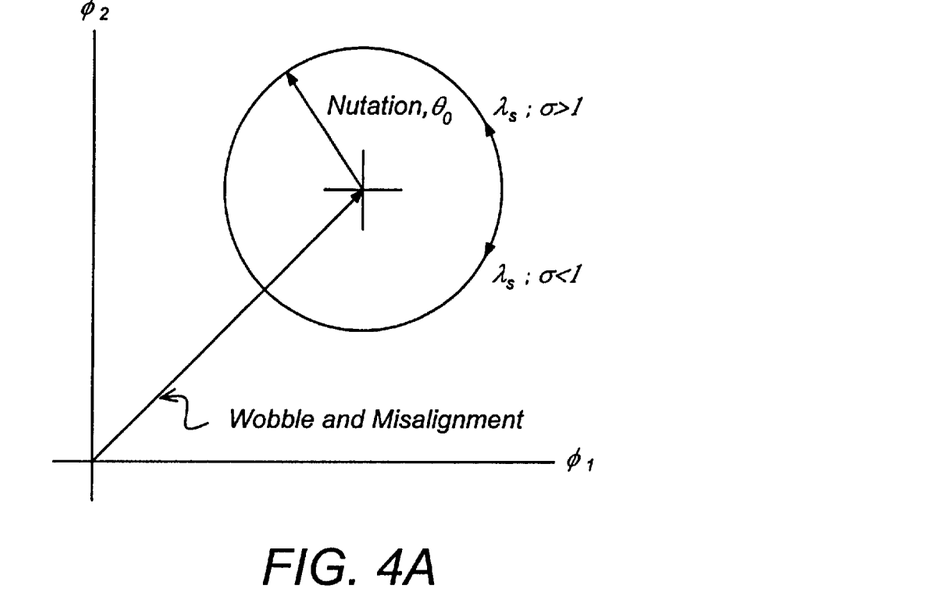
FIGS. 4A and 4B are diagrams showing a representation of sensor error components.

FIG. 4A is a diagram depicting a representation of the attitude sensor measurement components due to nutation alone. From equations (2)–(4) above, it can be seen that when nutation-related errors $\theta_0$ (and not attitude-related errors $\Phi_0$) are the only contributors to sensor measurement components, the quantity $\Phi_2+[1/\lambda_0]\omega_1$ and the corresponding expression from the companion transverse axis vanish.

In the foregoing description, it has been assumed that the spacecraft 102 is perfectly balanced, with principal axis of inertia (axis of maximum or minimum inertia) coincident with the z-axis 104, and the attitude error $\Phi_0$ is the scalar angle between the momentum vector M 105 and some reference inertial direction, such as the direction to a star or the vernal equinox. In the absence of external torques, this angle is fixed when viewed in an inertially fixed frame, but the spacecraft body rotation, through the sensor kinematics, 204 causes the attitude sensor 112 output(s) to be sinusoidal at spin rate $\omega_s$, which can be expressed as:

$$\Phi(t)=[\Phi_1(t),\Phi_2(t)]^T=\Phi_0[\cos \omega_s t, \sin \omega_s t]^T \quad (14)$$

Figure 4B:
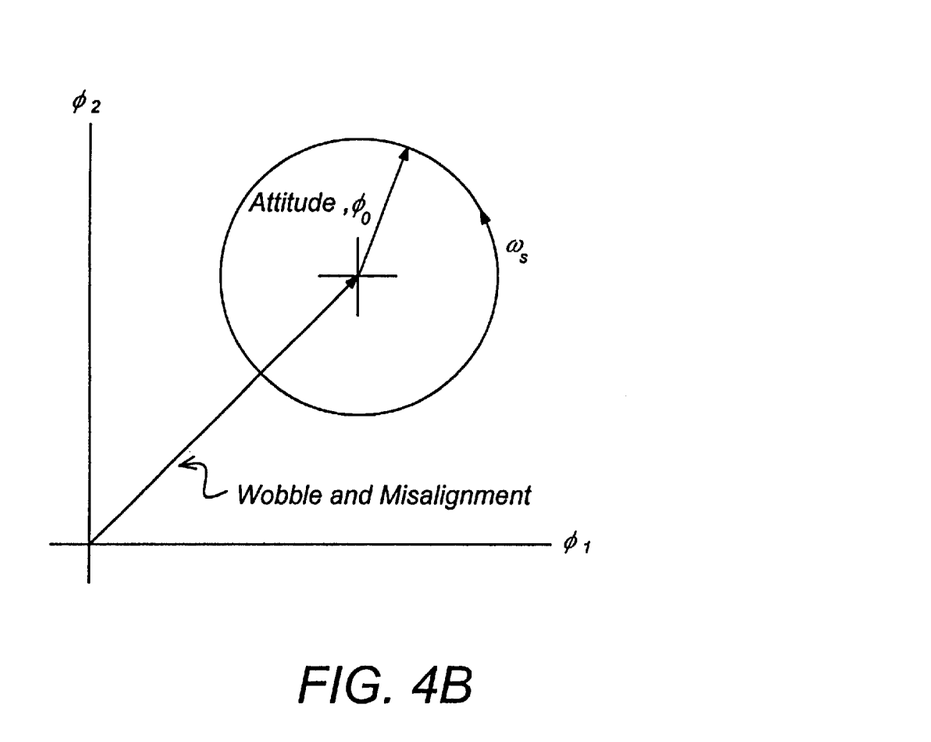

FIG. 4B presents the case where nutation-related errors $\theta_0$ do not contribute to attitude sensor measurement components, and attitude errors $\Phi_0$ alone exist. Here, the spin rate rotating vector component is as described in equation (14) above, and the constant sensor measurement components due to dynamic imbalance (wobble) and sensor misalignment define the position of the center of the circle.

Applying the foregoing, it can be seen that when there is only attitude error $\Phi_0$, a spin frequency sinusoid with a magnitude proportional to the attitude error $\Phi_0$ is seen at the thruster control logic (neglecting the control compensation G(s) 222). That error signal is described as $$e_1(t)=\Phi_2(t)+[\alpha/\lambda_0]\omega_1(t)=\Phi_2(t) \quad (15)$$

because $\omega_1(t)$ vanishes in the absence of nutation.

The spin axis controller uses the error signal e(t) 228 described above to trigger axial thruster 120 pulses on its positive half cycles to correct the attitude error $\Phi_0$ down to the control deadband defined by the deadband 226A element. This provides spin-synchronous attitude correction pulses, which can be properly phased by judicious selection of the location of the sensors 110, 112, torquer, and control compensation G(s) 222. Control compensation G(s) substantially removes constant rate and attitude components due to imbalance, alignment and other factors, and passes nutation and spin frequency components with perhaps some phase compensation. G(s) may also be designed to substantially reject significant body-fixed disturbance torque step functions induced by misalignments. In an embodiment where the spin rate $\omega_s$=5 rotations per minute and the inertial ratio $\sigma\approx0.49$, a rate to position gain weighting of $\alpha=1.5$, and a control thruster deadband of about 0.1 degrees, G(s) may be selected as equal to $5s/[(s+0.1)(s+5)]$.

When there is nutation error, consider the hypothetical case of $\alpha=1$, wherein only attitude error is sensed, and equation (15) becomes:

$$e1(t)=\Phi_2(t)+[1/\lambda_0]\omega_1(t) \quad (16)$$

and the position and rate terms induced by nutation cancel such that nutation is decoupled or absent from the feedback.

The residual signal contains only attitude error component and attitude control is effected as described above for the case where there is no nutation.

Similarly when there is notation error only, equation (15) is expressed as shown in equation (17) below, $$e_1(t)=\Phi_2(t)+[\alpha/\lambda_0]\omega_1(t)=[(\alpha-1)/\lambda_0]\omega_1(t) \quad (17)$$

which contains only nutation. Thus, it is seen that as either component becomes small, the other dominate the control feedback and will properly synchronize thruster pulses to control that component. We can think of (16) as an attitude sensor only and (17) as a nutation sensor, and this architecture (as shown in FIG. 2) tends to provide sensing and control of each independently.

As described above, the selection of the proportionality factor a allows the control of either the nutation or the attitude of the spacecraft 102. Also, proper selection of the proportionality factor a allows use of the foregoing technique to control both the nutation or attitude of the spacecraft 102 with the relatively larger error dominating the error signal, and hence, the thruster control until that component is reduced to the neighborhood of the control threshold (i.e. by the deadband value 226). In one embodiment, the proportionality factor $\alpha$ is selected as approximately 1.5.

In the implementation shown in FIG. 2, attitude sensors 112A and 112B (hereinafter alternatively referred to as attitude sensor(s) 112) such as a staring sun or star sensor is used to determine the spacecraft body angle estimates $\hat{\Phi}_1(t)$ and $\hat{\Phi}_2(t)$. However, the present invention can be implemented without attitude sensors. In this alternative embodiment, the attitude angle information is derived from other sensor information. For example, a quaternion calculation (using information from the rate sensors 110 for example) can be used. This quaternion calculation can be pure integration of gyro rates, or it can be updated using one or more measurements from a staring sensor or a spinning slit sensor, as required.

Figure 5:
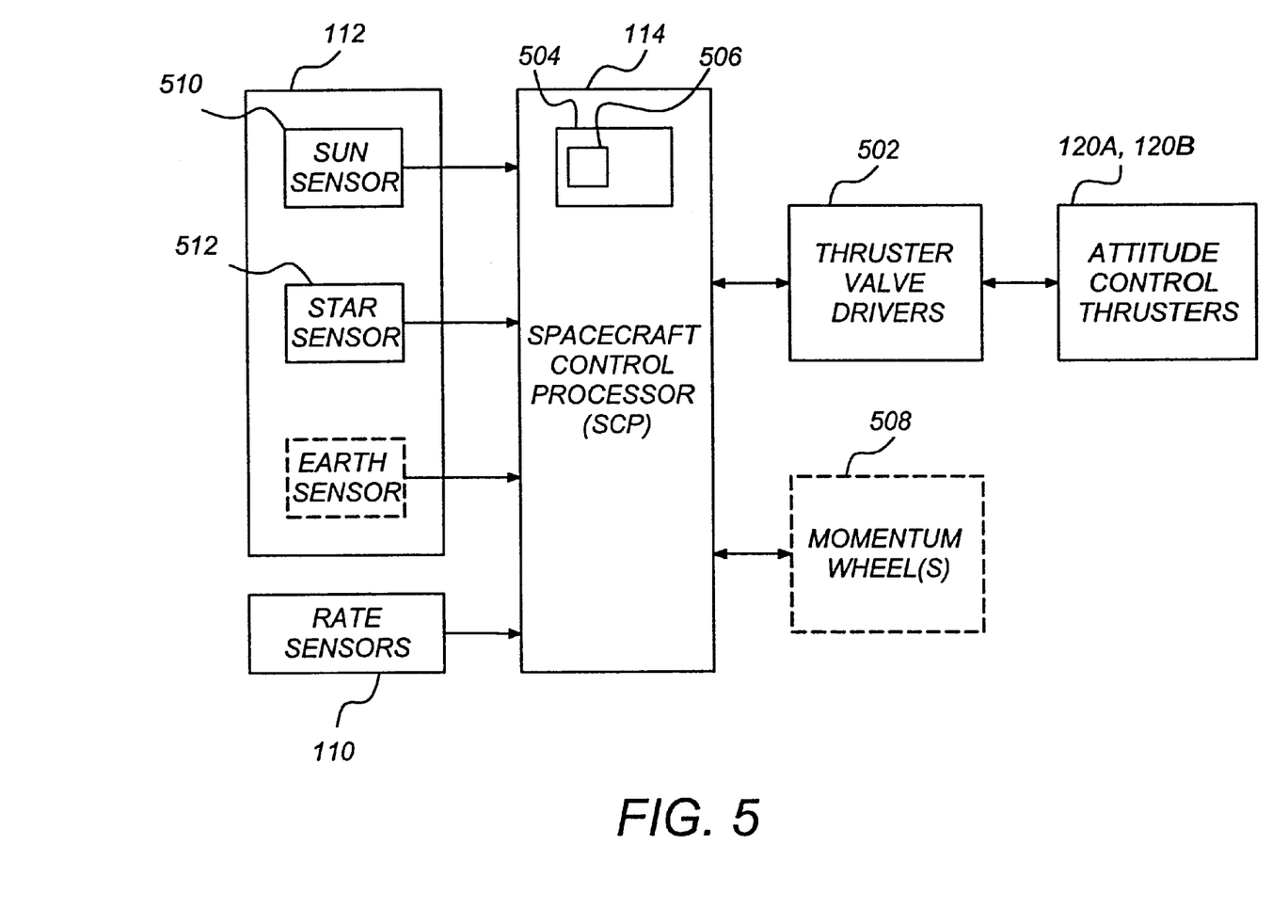
FIG. 5 is a schematic block diagram of one implementation of the spin axis controller.

FIG. 5 is a schematic block diagram of one implementation of the spin axis controller. The attitude angle sensors 112 can include a sun sensor 510, a star sensor 512, an earth sensor, or any combination thereof Rate sensors 110 and attitude angle sensors 112 provide spacecraft 102 kinematic measurements to the spacecraft control processor (SCP) 114. The spacecraft control processor 114, thruster valve drivers 502, and attitude control thrusters 102A and 102B implement the spin axis controller functions described above. The SCP can be implemented as a single processor, with a plurality of modules for performing specific functions, or can include a plurality of processors. As described above, the present invention can be implemented with momentum wheels 508.

The spacecraft processor 114 typically comprises a processor and a memory 504, such as random access memory (RAM). Generally, the spacecraft processor 114 operates under control of an operating system 506 stored in the memory 504, and interfaces with the other system components to accept inputs and generate outputs, including commands. Applications running in the spacecraft processor 114 access and manipulate data stored in the memory 504. The spacecraft 102 may also comprise an external communication device such as a satellite link for communicating with other computers at, for example, a ground station. If necessary, operation instructions for new applications can be uploaded from ground stations.

In one embodiment, instructions implementing the operating system 506, application programs, and other modules are tangibly embodied in a computer-readable medium, e.g., data storage device, which could include a RAM, EEPROM, or other memory device. Further, the operating system 506 and the computer program are comprised of instructions which, when read and executed by the spacecraft processor 114, causes the spacecraft processor 114 to perform the steps necessary to implement and/or use the present invention. Computer program and/or operating instructions may also be tangibly embodied in memory 504 and/or data communications devices (e.g. other devices in the spacecraft 102 or on the ground), thereby making a computer program product or article of manufacture according to the invention. As such, the terms "program storage device," "article of manufacture" and "computer program product" as used herein are intended to encompass a computer program accessible from any computer readable device or media.

Figure 6:
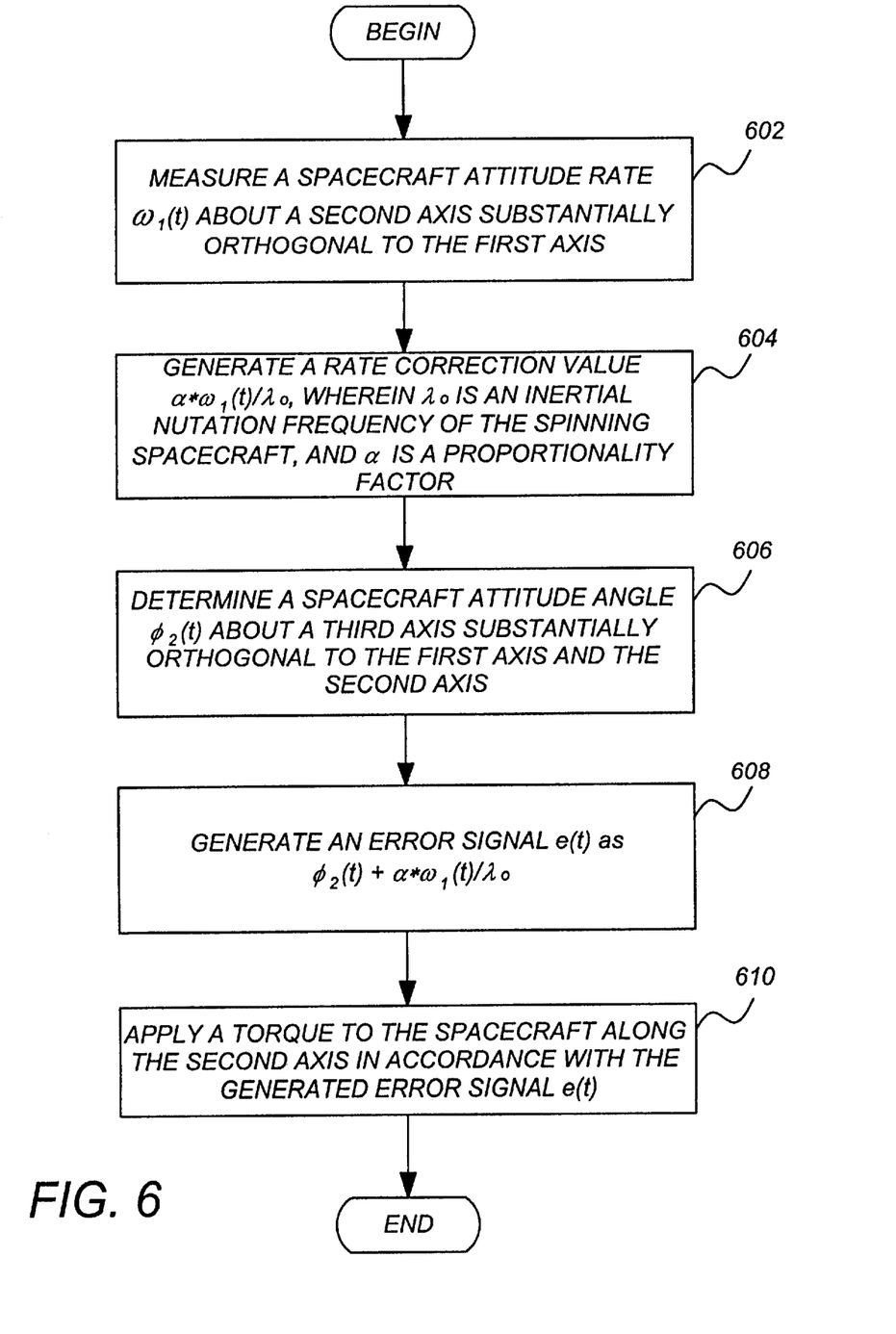
FIG. 6 is a flow chart presenting exemplary process steps used to practice one embodiment of the present invention.

FIG. 6 is a flow chart illustrating exemplary process steps used to practice one embodiment of the present invention. First, the spacecraft attitude rate $\omega_1(t)$ about a second axis is measured. The second axis is substantially orthogonal to a first spacecraft axis about which the spacecraft is spinning at ($o$,. This is shown in block 602. A rate correction value, $\alpha\omega_1(t)/\lambda_0$, is formed, wherein $\lambda_0$ is an inertial nutation frequency of the spinning spacecraft, and $\alpha$ is a proportionality factor. This is depicted in block 604. Further, a spacecraft attitude angle $\phi_2(t)$ is determined about a third axis, which is substantially orthogonal to the first axis and the second axis, as shown in block 606. An error signal e(t) is generated as $\phi_2(t)+\alpha\omega_1(t)/\lambda_0$, and a torque is applied to rotate the spacecraft 102 along the second axis. This is shown in blocks 608 and 610.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Conclusion

This concludes the description of the preferred embodiments of the present invention. In summary, the present invention describes a method, apparatus, and article of manufacture for controlling the nutation and attitude of a spacecraft spinning about a first axis.

The method comprises the steps of measuring a spacecraft attitude rate $\omega_1(t)$ about a second axis substantially orthogonal to the first axis; generating a rate correction value $\alpha\omega_1(t)/\lambda_0$, wherein $\lambda_0$ is an inertial nutation frequency of the spinning spacecraft, and $\alpha$ is a proportionality factor; determining a spacecraft attitude angle $\phi_2(t)$ about a third axis substantially orthogonal to the first axis and the second axis; generating an error signal e(t) as $\phi_2(t)+\alpha\omega_1(t)/\lambda_0$; and applying a torque to rotate the spacecraft along the second axis. The article of manufacture comprises a program storage device implementing the instructions described above.

The apparatus comprises an attitude rate sensor for measuring the spacecraft attitude rate $\omega_1(t)$ about a second axis substantially orthogonal to the first axis; means for measuring a spacecraft attitude angle $\phi_2(t)$ about a third axis substantially orthogonal to the first axis; a processor, in communication with the attitude rate sensor, for generating an error signal e(t)=$\phi_2(t)+\alpha\omega_1(t)/\lambda_0$, wherein $\lambda_0$ is an inertial nutation frequency of the spinning spacecraft, and a is a proportionality factor; and a torquer for applying a torque to the spacecraft along the second axis in accordance with the generated error signal e(t).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of controlling a spacecraft spinning about a first axis, comprising the steps of:
    measuring a spacecraft attitude rate $\omega_1(t)$ about a second axis substantially orthogonal to the first axis;
    generating a rate correction value $\alpha\omega_1(t)/\lambda_0$, wherein $\lambda_0$ is an inertial nutation frequency of the spinning spacecraft, and a is a proportionality factor;
    determining a spacecraft attitude angle $\phi_2(t)$ about a third axis substantially orthogonal to the first axis and the second axis;
    generating an error signal e(t) as $\phi_2(t)+\alpha\omega_1(t)/\lambda_0$; and
    applying a torque to rotate the spacecraft along the second axis in accordance with the generated error signal e(t).

2. The method of claim 1, wherein the proportionality factor a is unity.

3. The method of claim 1, wherein the proportionality factor is non-unity.

4. The method of claim 1, wherein the proportionality factor is approximately 1.5.

5. The method of claim 1, wherein the step of determining a spacecraft attitude angle $\phi_2$ about a third axis substantially orthogonal to the first axis and the second axis comprises the step of measuring the spacecraft attitude angle $\phi_2$.

6. The method of claim 5, wherein the spacecraft attitude angle $\phi_2$ is measured with a sun sensor.

7. The method of claim 5, wherein the spacecraft attitude angle $\phi_2$ is measured with a star sensor.

8. The method of claim 1, wherein the step of determining a spacecraft attitude angle $\phi_2$ about a third axis substantially orthogonal to the first axis and the second axis comprises the steps of:
    measuring the spacecraft attitude rate $\omega_3$ about the second axis; and
    determining the spacecraft attitude angle $\phi_2$ from a spacecraft attitude rate $\omega_2$.

9. The method of claim 1, wherein the spacecraft comprises a thruster disposed substantially orthogonal to the second axis, and wherein the step of applying a torque to the spacecraft along a second axis in accordance with the generated error signal e(t) comprises the step of firing the thruster.

10. The method of claim 1, wherein the spacecraft comprises an internal torquer selected from the group comprising a momentum wheel and a reaction wheel, and wherein the step of applying a torque to the spacecraft along the second axis in accordance with the generated error signal e(t) comprises the step of supplying a torque to the internal torquer.

11. An apparatus for controlling a spacecraft spinning about a first axis, comprising:
    means for measuring a spacecraft attitude rate $\omega_1(t)$ about a second axis substantially orthogonal to the first axis;
    means for generating a rate correction value $\alpha\omega_1(t)/\lambda_0$, wherein $\lambda_0$ is an inertial nutation frequency of the spinning spacecraft, and ax is a proportionality factor;
    means for determining a spacecraft attitude angle $\phi_2(t)$ about a third axis substantially orthogonal to the first axis and the second axis;
    means for generating an error signal e(t) as $\phi_2(t)+\alpha\omega_1(t)/\lambda_0$; and
    means for applying a torque to rotate the spacecraft along the second axis in accordance with the generated error signal e(t).

12. The apparatus of claim 11, wherein the proportionality factor $\alpha$ is unity.

13. The apparatus of claim 11, wherein the proportionality factor is non-unity.

14. The apparatus of claim 11, wherein the proportionality factor is approximately 1.5.

15. The apparatus of claim 11, wherein the means for determining a spacecraft attitude angle $\phi_2$ about a third axis substantially orthogonal to the first axis and the second axis comprises the step of measuring the spacecraft attitude angle $\phi_2$.

16. The apparatus of claim 15, wherein the spacecraft attitude angle $\phi_2$ is measured with a sun sensor.

17. The apparatus of claim 15, wherein the spacecraft attitude angle $\phi_2$ is measured with a star sensor.

18. The apparatus of claim 11, wherein the means for determining a spacecraft attitude angle $\phi_2$ about a third axis substantially orthogonal to the first axis and the second axis comprises:
    means for measuring the spacecraft attitude rate $\omega_2$ about the second axis; and
    means for determining the spacecraft attitude angle $\phi_2$ from a spacecraft attitude rate $\omega_2$.

19. The apparatus of claim 11, wherein the spacecraft comprises a thruster disposed substantially orthogonal to the second axis, and wherein the means for applying a torque to the spacecraft along a second axis in accordance with the generated error signal e(t) comprises means for firing the thruster.

20. The apparatus of claim 11, wherein the spacecraft comprises an internal torquer selected from the group comprising a momentum wheel and a reaction wheel, and wherein means for applying a torque to the spacecraft along the second axis in accordance with the generated error signal e(t) comprises means for supplying a torque to the internal torquer.

21. A program storage device, readable by a computer, tangibly embodying at least one program of instructions executable by the computer to perform method steps of controlling a spacecraft spinning about a first axis, the method comprising the steps of:
    measuring a spacecraft attitude rate $\omega_1(t)$ about a second axis substantially orthogonal to the first axis;
    generating a rate correction value $\alpha\omega_1(t)/\lambda_0$, wherein $\lambda_0$ is an inertial nutation frequency of the spinning spacecraft, and $\alpha$ is a proportionality factor;
    determining a spacecraft attitude angle $\phi_2(t)$ about a third axis substantially orthogonal to the first axis and the second axis;
    generating an error signal e(t) as $\phi_2(t)+\alpha\omega_1(t)/\lambda_0$; and
    applying a torque to rotate the spacecraft along the second axis in accordance with the generated error signal e(t).

22. The program storage device of claim 21, wherein the proportionality factor a is unity.

23. The program storage device of claim 21, wherein the proportionality factor is non-unity.

24. The program storage device of claim 21, wherein the proportionality factor is approximately 1.5.

25. The program storage device of claim 21, wherein the method step of determining a spacecraft attitude angle $\phi_2$ about a third axis substantially orthogonal to the first axis and the second axis comprises the method step of measuring the spacecraft attitude angle $\phi_2$.

26. The program storage device of claim 25, wherein the spacecraft attitude angle $\phi_2$ is measured with a sun sensor.

27. The program storage device of claim 25, wherein the spacecraft attitude angle $\phi_2$ is measured with a star sensor.

28. The program storage device of claim 21, wherein the method step of determining a spacecraft attitude angle $\phi_2$ about a third axis substantially orthogonal to the first axis and the second axis comprises the method steps of:

measuring the spacecraft attitude rate $\omega_2$ about the second axis; and determining the spacecraft attitude angle $\phi_2$ from a spacecraft attitude rate $\omega_2$.

29. The program storage device of claim 21, wherein the spacecraft comprises a thruster disposed substantially orthogonal to the second axis, and wherein the method step of applying a torque to the spacecraft along a second axis in accordance with the generated error signal e(t) comprises the step of firing the thruster.

30. The program storage device of claim 21, wherein the spacecraft comprises an internal torquer selected from the group comprising a momentum wheel and a reaction wheel, and wherein the method step of applying a torque to the spacecraft along the second axis in accordance with the generated error signal e(t) comprises the step of supplying a torque to the internal torquer.

31. An apparatus for controlling a spacecraft spinning about a first axis, comprising:

an attitude rate sensor for measuring the spacecraft attitude rate $\omega_1(t)$ about a second axis substantially orthogonal to the first axis;

means for measuring a spacecraft attitude angle $\phi_2(t)$ about a third axis substantially orthogonal to the first axis;

a processor, in communication with the attitude rate sensor and the means for measuring a spacecraft attitude angle $\phi_2(t)$, for generating an error signal $e(t)=\phi_2(t)+\alpha\omega_1(t)/\lambda_0$, wherein $\lambda_0$ is an inertial nutation frequency of the spinning spacecraft, and a is a proportionality factor; and a torquer for applying a torque to the spacecraft along the second axis in accordance with the generated error signal e(t).

32. The apparatus of claim 31, wherein the torquer is an external torquer.

33. The apparatus of claim 32, wherein the external torquer is an axial thruster.

34. The apparatus of claim 31, wherein the torquer is selected from a group comprising a momentum wheel and a reaction wheel.

35. The apparatus of claim 31, wherein the means for measuring a spacecraft attitude angle $\phi_2(t)$ about a third axis substantially orthogonal to the first axis comprises a spacecraft attitude angle sensor.

36. The apparatus of claim 35, wherein the spacecraft attitude angle sensor is a sun sensor.

37. The apparatus of claim 35, wherein the spacecraft attitude angle sensor is a star sensor.

38. The apparatus of claim 31, wherein the means for measuring a spacecraft attitude angle $\phi_2(t)$ about a third axis substantially orthogonal to the first axis comprises:

the attitude rate sensor; and a module, implemented in the processor for determining the spacecraft attitude angle from the measured spacecraft attitude rate $\omega_1(t)$.

39. The apparatus of claim 38 above, wherein the module implements a quaternion calculation on the measured spacecraft attitude rate $\omega_1(t)$.

* * * * *